United States Patent
Harper et al.

(10) Patent No.: US 10,445,138 B2
(45) Date of Patent: *Oct. 15, 2019

(54) OPTIMIZING SIMULTANEOUS STARTUP OR MODIFICATION OF INTER-DEPENDENT MACHINES WITH SPECIFIED PRIORITIES

(71) Applicant: International Business Machines Corporation, Armonk, NY (US)

(72) Inventors: Richard E. Harper, Chapel Hill, NC (US); Ruchi Mahindru, Elmsford, NY (US); HariGovind V. Ramasamy, Ossining, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/859,604

(22) Filed: Dec. 31, 2017

(65) Prior Publication Data

US 2018/0121241 A1  May 3, 2018

Related U.S. Application Data

(63) Continuation of application No. 15/629,836, filed on Jun. 22, 2017, now Pat. No. 10,268,512.

(Continued)

(51) Int. Cl.
*G06F 9/48* (2006.01)
*G06F 9/455* (2018.01)
(Continued)

(52) U.S. Cl.
CPC ........ *G06F 9/4881* (2013.01); *G06F 9/45558* (2013.01); *G06F 9/505* (2013.01);
(Continued)

(58) Field of Classification Search
CPC ..................................................... G06F 9/4881
(Continued)

(56) References Cited

U.S. PATENT DOCUMENTS 5,805,785 A  9/1998  Dias et al.
5,946,698 A  8/1999  Lomet
(Continued)

OTHER PUBLICATIONS

Kück, Dipl-Math Mirko, and Till Becker. "Potentials and risks of resource sharing in production and logistics." (2016). pp. 199-209 (Year: 2016).*

(Continued)

*Primary Examiner* — Satish Rampuria
(74) *Attorney, Agent, or Firm* — JoAnn Crockatt; Otterstedt, Wallace & Kammer, LLP

(57) ABSTRACT

Identify individual machines of a multi-machine computing system. Construct a graph of dependencies among the machines. Obtain estimated total administration times and administration priorities for each of the machines. Identify availability of administration resources to assist in administration of one or more of the machines. Select a first set of machines for administration in response to the graph, administration priorities, estimated total administration times, and availability of the first set of administration resources, and administer the first set of machines in parallel using the first set of administration resources. Update the graph in response to administration of the first set of machines. Select a subsequent set of machines for administration in response to the updated graph, administration priorities, estimated total administration times, and availability of a subsequent set of administration resources. Administer the subsequent set of machines in parallel using the subsequent set of administration resources.

10 Claims, 8 Drawing Sheets

Related U.S. Application Data

(60) Provisional application No. 62/354,001, filed on Jun. 23, 2016.

(51) Int. Cl.
  *G06F 16/901* (2019.01)
  *G06F 9/50* (2006.01)

(52) U.S. Cl.
  CPC ........ *G06F 9/5038* (2013.01); *G06F 16/9024* (2019.01); *G06F 2009/45595* (2013.01)

(58) Field of Classification Search
  USPC .................................................... 718/1–108
  See application file for complete search history.

(56) References Cited

U.S. PATENT DOCUMENTS

| | | | |
|---|---|---|---|
| 6,883,170 | B1 | 4/2005 | Garcia |
| 7,536,603 | B2 | 5/2009 | Coldicott et al. |
| 7,707,451 | B2 | 4/2010 | Buskens et al. |
| 8,402,304 | B1 | 3/2013 | Shaw et al. |
| 8,793,379 | B2 | 7/2014 | Upadhya |
| 8,843,936 | B2 * | 9/2014 | Kenkre ............ G06Q 10/06313 718/104 |
| 9,582,355 | B2 * | 2/2017 | Luby ..................... G06F 3/0617 |
| 2003/0149735 | A1 | 8/2003 | Stark et al. |
| 2006/0294507 | A1 * | 12/2006 | Buskens ............... G06F 9/5066 717/133 |
| 2009/0172669 | A1 * | 7/2009 | Bobak ...................... G06F 8/34 718/100 |
| 2011/0093853 | A1 * | 4/2011 | Bobak .................... G06Q 10/06 718/100 |
| 2015/0113527 | A1 * | 4/2015 | Diard .................. G06F 9/45533 718/1 |
| 2015/0127970 | A1 | 5/2015 | Bivens et al. |
| 2017/0075719 | A1 * | 3/2017 | Scallan ............... G06F 11/1484 |

OTHER PUBLICATIONS

Krasic, Charles, and Jean-Sébastien Légaré. "Interactivity and scalability enhancements for quality-adaptive streaming." Proceedings of the 16th ACM international conference on Multimedia. ACM, 2008. pp. 753-756 (Year: 2008).*

Xu, Yuming, et al. "A multiple priority queueing genetic algorithm for task scheduling on heterogeneous computing systems." 2012 IEEE 14th International Conference on High Performance Computing and Communication IEEE, 2012. pp. 639-646 (Year: 2012).*

Levitin, Gregory. "Optimal multilevel protection in series-parallel systems." Reliability Engineering & System Safety 81.1 (2003): pp. 93-102. (Year: 2003).

Firestone, Roger M. Parallel programming: operational model and detection of parallelism. Diss. New York University, 1971. pp. 1-21 (Year: 1971).

Chowdhury, NM Mosharaf Kabir, and Raouf Boutaba. "A survey of network virtualization." Computer Networks 54.5 (2010): pp. 862-876. (Year: 2010).

Peter Mell et al., "The NIST Definition of Cloud Computing," Special Publication 800-145, Sep. 2011, pp. 1-7.

Richard E. Harper et al., published U.S. Appl. No. 15/629,836, filed Jun. 22, 2017, Optimizing Simultaneous Startup or Modification of Inter-Dependent Machines With Specified Priorities, pp. 1-28 plus 8 sheets of drawings.

Paul J. Otterstedt, List of IBM Patents or Patent Applications Treated as Related, Jun. 26, 2018, pp. 1-2.

* cited by examiner $$FP(v) = \begin{cases} P(v), & \text{if } v \text{ is a leaf} \\ Min(P(v), FP(q_i)) \text{ for all nodes } q_i \text{ that directly depend on } v) \end{cases}$$

$$ET(v) = \begin{cases} T(v) + Max(ET(q_i)) \text{ for all nodes } q_i \text{ that directly depend on } v), \text{ if } m \to \infty \\ T(v) + \sum (ET(q_i)) \text{ for all nodes } q_i \text{ that directly depend on } v), \text{ if } m=1 \\ T(v) + r \cdot Max(ET(q_i)) + (1-r) \cdot \sum (ET(q_i)), \text{ for other } m \text{ values} \end{cases}$$

```
Algorithm select_nodes (forest_roots, num_workers)
    forest_roots: the list of nodes in the forest roots
    num_workers: how many workers available to be fed sort forest_roots in increasing order of their FP values (for
nodes with equal FP values, in decreasing order of their ET
values)
    initialize selected as an empty list;
    for (i=0; i<forest_roots.size(); i++) {
        if (selected.size() >= num_workers) // no idle worker
            break;
        forest_node = forest_roots.get(i);
        if (forest_node is already under recovery)
            continue;                                        406
        selected.add(forest_node);   // select forest_node
        mark forest_node as "under recovery";
    }
    return selected;
```

```
Algorithm nodes_complete (forest_roots, completed_nodes)
    forest_roots: the list of nodes in the forest roots
    completed_nodes: the list of nodes that just completed
recovery for (i=0; i<completed_nodes.size(); i++) {
        forest_node = completed_nodes.get(i);             410
        mark forest_node as "recovered";
        forest_roots.remove(forest_node);
        next_to_recover = set of nodes {v}, such that v depends on
forest_node, and all nodes dependent on v are recovered;
        forest_roots.add(next_to_recover);
    }
```

*FIG. 7*

OPTIMIZING SIMULTANEOUS STARTUP OR MODIFICATION OF INTER-DEPENDENT MACHINES WITH SPECIFIED PRIORITIES

CROSS-REFERENCE TO RELATED APPLICATIONS

This application claims the benefit of U.S. Provisional Patent Application No. 62/354,001 filed on Jun. 23, 2016, the complete disclosure of which is expressly incorporated by reference herein in its entirety for all purposes. This application is a continuation of U.S. patent application Ser. No. 15/629,836 filed Jun. 22, 2017, now U.S. Pat. No. 10,268,512, the complete disclosure of which is expressly incorporated herein by reference in its entirety for all purposes

BACKGROUND

The present invention relates to the electrical, electronic and computer arts, and, more particularly, to cloud computing and the like.

Maintaining continuity of information technology (IT) operations despite the occurrence of disasters is critical for many businesses. The disasters may be natural disasters such as earthquakes or hurricanes, or man-made disasters such as computer-based attacks or power outages. Disaster recovery (DR) refers to the ability to recover from outages caused by disasters. A number of industries (e.g., financial institutions and health care providers in the United States) are bound by law to recover from IT outages caused by disasters within specified time intervals. With the increasing popularity of cloud platforms to host business applications, DR has become an important service offered by providers of enterprise-class cloud systems such as Platform-as-a-Service (PaaS), Infrastructure-as-a-Service (IaaS), and Software-as-a-Service (SaaS). Accordingly, startup or modification of a large number of machines in parallel within a very short time is required in certain cases; for example, cloud-scale disaster recovery requires a short administration time objective.

SUMMARY

Principles of the invention provide techniques for optimizing simultaneous startup or modification of inter-dependent machines with specified priorities. According to principles and techniques of the invention, a scheduling algorithm starts up, recovers, renders available, or otherwise modifies ("administers") individual machines within a multi-machine computing system by taking into account application-level logical dependencies among the machines and the business criticalities of the applications resident on those machines.

In one aspect, an exemplary computer-implemented method includes identifying a plurality of nodes that correspond to individual machines of the multi-machine computing system; obtaining, at at least one of the individual machines, estimated total administration times for each of the nodes; and obtaining, at the at least one of the individual machines, administration priorities for each of the nodes. The exemplary method further includes constructing, in at least one of the individual machines, a graph of dependencies among the nodes. The exemplary method also includes identifying, at the at least one of the individual machines, availability of a first set of administration resources to assist in administration of one or more of the individual machines. The exemplary method further includes selecting, at the at least one of the individual machines, a first set of the nodes for administration in response to the graph of dependencies, administration priorities, estimated total administration times, and availability of the first set of administration resources. The method includes administering a first set of machines, corresponding to the first set of the nodes, in parallel using the first set of administration resources. Additionally, the graph of dependencies is updated in response to administration of the first set of machines. The exemplary method then returns to selecting, at the least one of the individual machines, a subsequent set of nodes for administration in response to the updated graph of dependencies, administration priorities, estimated total administration times, and availability of a subsequent set of administration resources; and proceeds to administering a subsequent set of machines, corresponding to the subsequent set of the nodes, in parallel using the subsequent set of administration resources.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Rapid administration of complex (interdependent) computing systems, taking account of inter-dependencies among machines as well as user preferences for administration schedule.

Parallel administration of multiple machines within a short time (e.g., following scheduled maintenance).

Administration of multiple machines taking account of dynamically changing resources for administration support.

Enhanced recovery from failures in a complex computing system thus improving the performance of the computing system itself.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 depicts equations for calculating priority and estimated administration time of a node in the graph of dependencies of FIG. 5, according to an exemplary embodiment;

FIG. 7 shows pseudocode for functions implementing the heuristic algorithm of FIG. 4, according to an exemplary embodiment.

DETAILED DESCRIPTION

Figure 1:
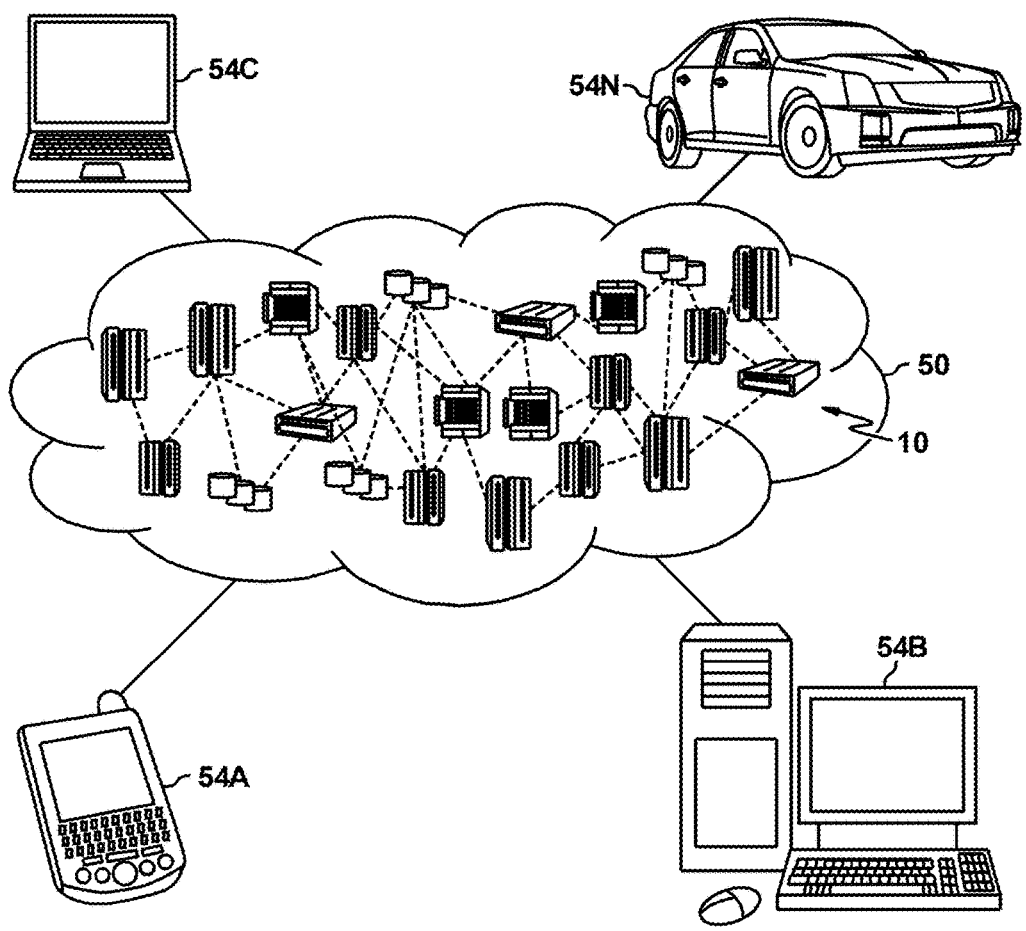
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
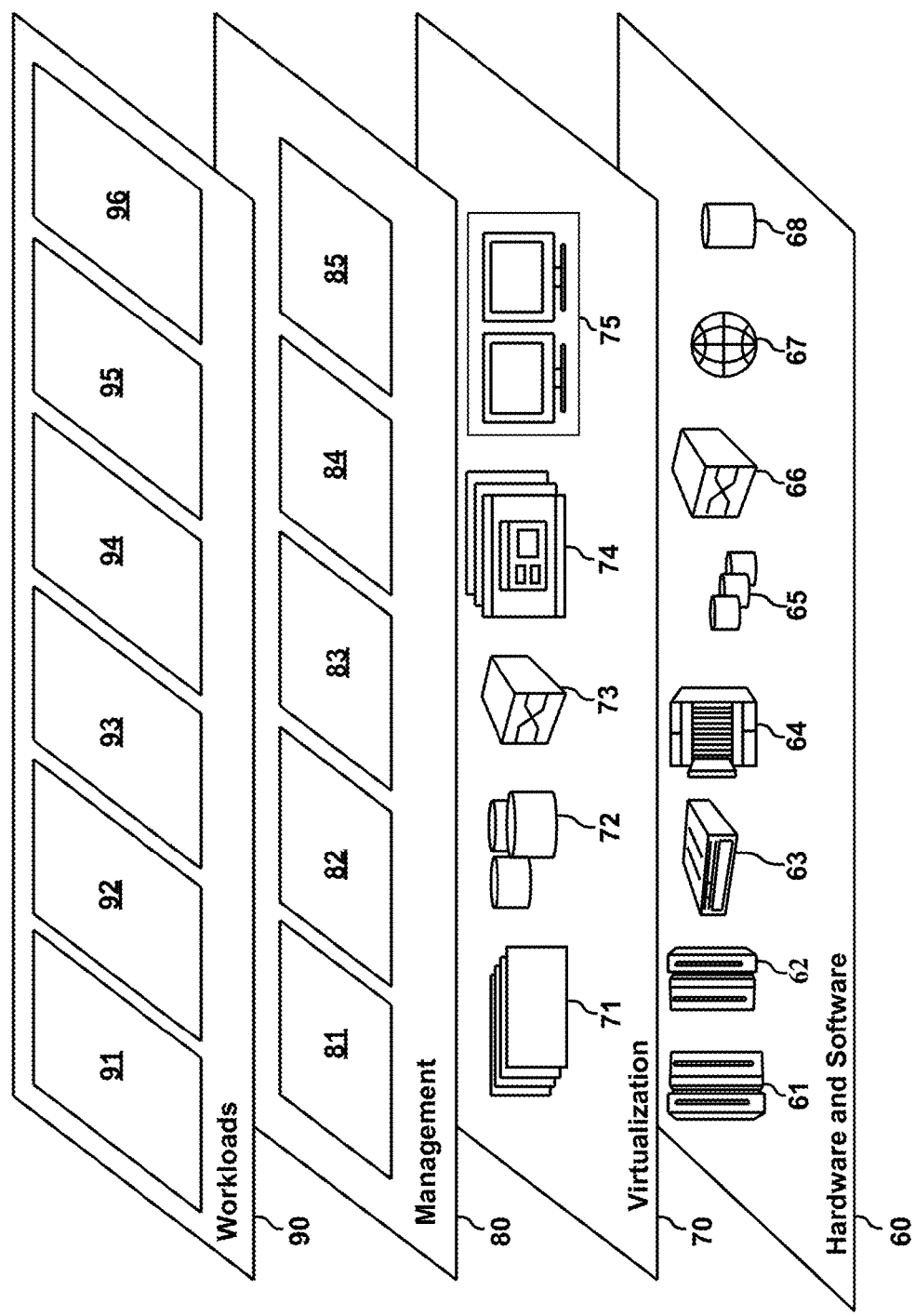
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a mobile desktop 96.

Figure 3:
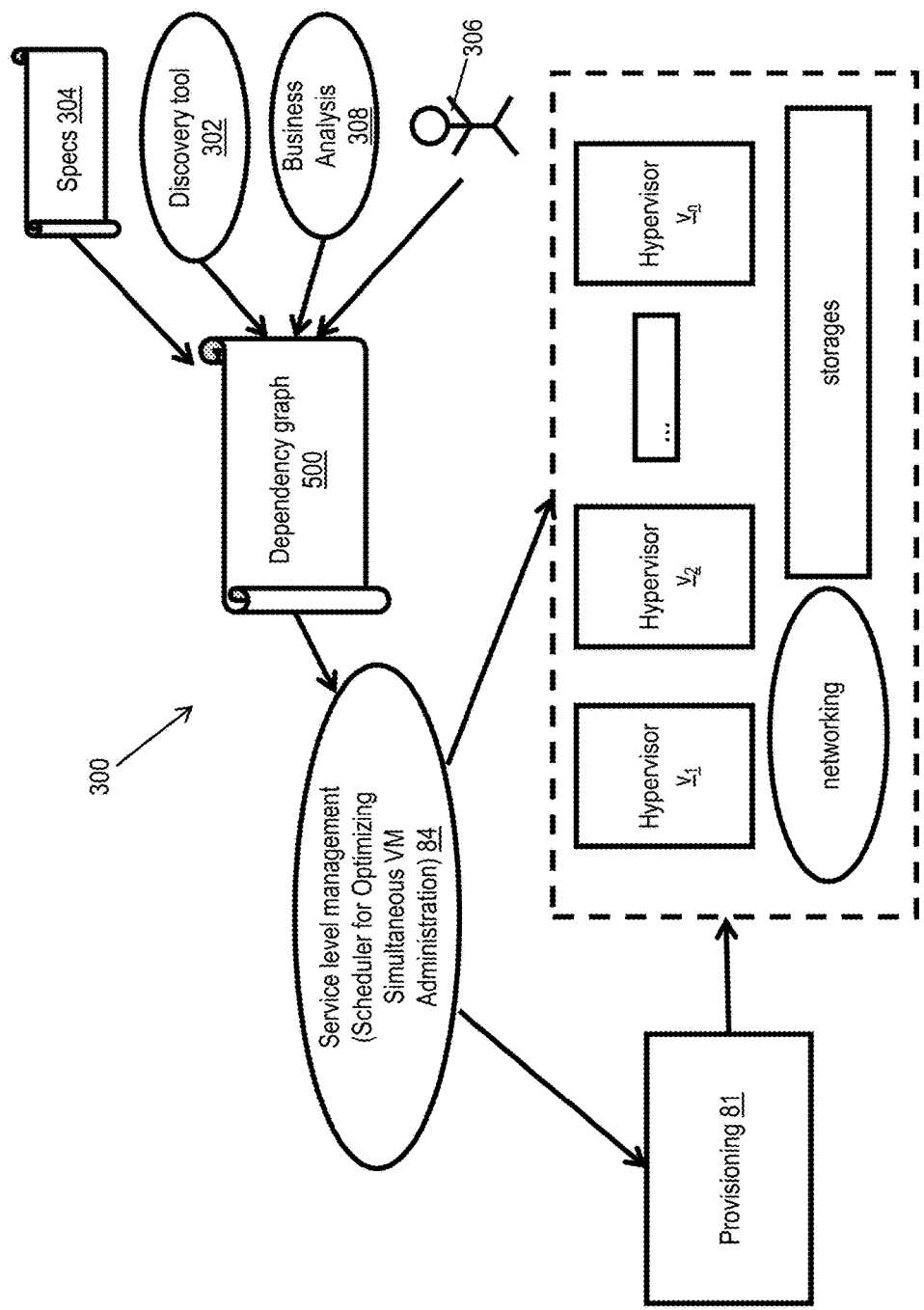
FIG. 3 depicts an exemplary architecture for optimizing simultaneous administration of inter-dependent machines, according to an exemplary embodiment.

According to one or more embodiments, as shown in FIG. 3, the service level management module 84 in the management layer 80 handles the problem of scheduling the administration order for multiple machines and/or components according to their dependencies and/or priorities, and/or reduce the total administration time of these multiple machines. Then the provisioning module 81 implements the solution provided by the service level management module 84 on multiple hypervisors, machines, or other nodes $v_1 \ldots v_n$. Thus, one or more embodiments provide an architecture 300 that supports:

1) Optimized scheduling of "trees" of an administration (dependency) graph 500 to reduce (e.g., minimize) total administration time.
2) A discovery tool 302 for developing the dependency graph 500.
3) Incorporation of multiple dimensions of resource constraints ("specs") 304 in the administration planning and optimization.
4) Accommodation of a variable number of administration resources 306 that are capable of performing parallel administration activities.
5) Assignment to each administration resource of a component that can be recovered in parallel.
6) Incorporation of user-specified priorities from a Business Impact Analysis 308.
7) Inheritance of user-specified priorities between related components in the graph of dependencies 500.
8) Update of estimated remaining administration time for a collection of components based on observed actual administration times.
9) Incorporation of observed and estimated administration times into subsequent administration planning.
10) Recognition of inter-dependencies among components.

According to other embodiments, the architecture 300 is implemented in a plurality of individual machines within a multi-machine computing system that is not a "cloud" computing system, for example, a system of individual machines that are connected with each other by local network connections.

One or more embodiments provide a system for administering or recovering a collection of interdependent workload components efficiently (e.g., in a shortest possible time); a method of obtaining one or more inputs from an analysis of the administration dependencies between components, the user-supplied administration priorities of the components (if no priority is specified, the default priority is "last"), and the estimated administration times of the components; a multi-parameter process that determines a maximally parallel plan for restarting the components that observes the administration dependencies and administration priorities, and restarts the interdependent network of workload components in the shortest time; an adaptive learning process that adjusts the estimate of the administration time for the remaining members of the interdependent network of restarting components based on the component restart times that have been observed thus far; a method of adjusting the estimates of the administration time of the interdependent network of the remaining components based on the adjusted administration times; a method of constantly updating the parallelized administration plan based on the adjusted estimates of the administration time of the remaining components so as to continuously create a plan that results in the shortest overall administration time; a method of estimating the number of administration resources that are needed in order to fully exploit the parallelism inherent in the network of restarting components in order to reduce the overall administration time; a system of creating a collection of administration resources capable of independently executing administration actions on separate components; and/or a method of providing to a number of administration resources the largest set of independent administration actions that can be carried out in parallel and concurrently at each point in time.

Figure 4:
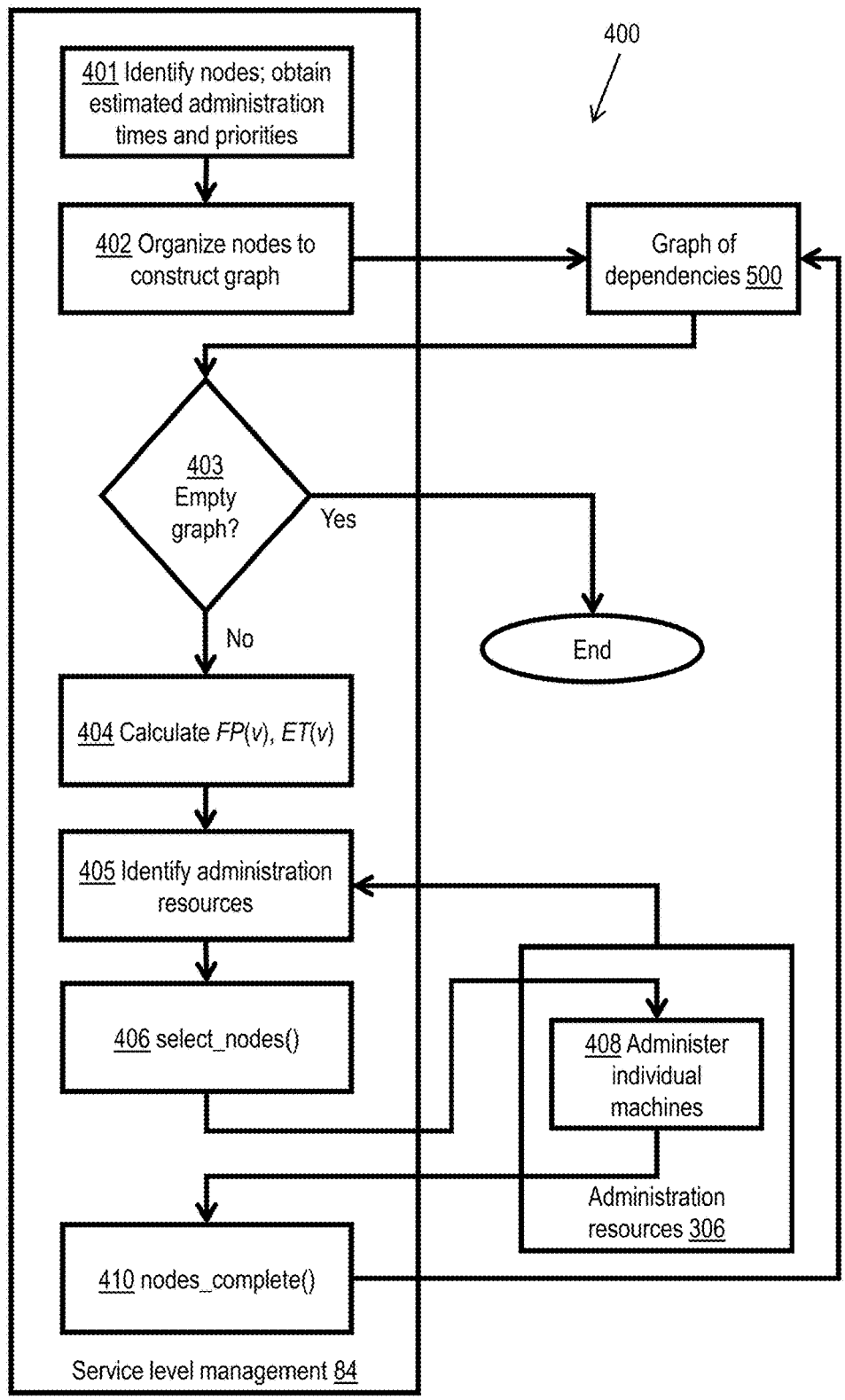
FIG. 4 depicts an heuristic algorithm for machine administration scheduling, according to an exemplary embodiment.

The service level management module 84 implements an administration scheduling heuristic algorithm 400, as shown in FIG. 4, that selects nodes to be recovered by utilizing any idle administration resources w, so as to minimize Max(AT(v) for all nodes v), while complying with the dependency relationships and machine priorities.

According to the administration scheduling algorithm 400, at 401 the service level management module 84 identifies nodes v that correspond to individual machines of a multi-machine computing system. At 402 the service level management module 84 organizes the nodes v to construct a forest of nodes (a graph of dependencies) 500.

Figure 5:
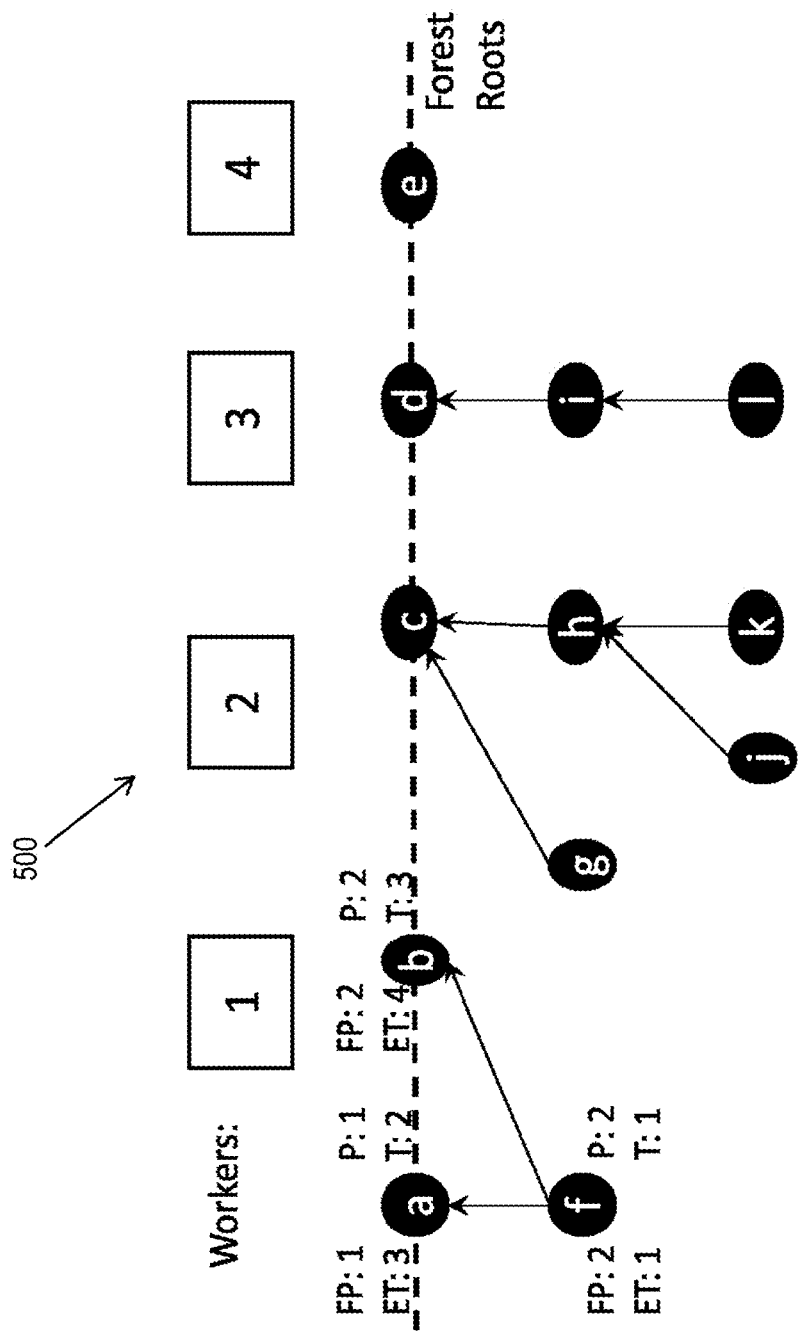
FIG. 5 depicts a graph of dependencies among machines of a multi-machine computing system, according to an exemplary embodiment.

FIG. 5 depicts the graph of dependencies 500. The graph of dependencies 500 and the algorithm 400 will be further explained using the following concepts and annotations. The variable v represents nodes, or machines to be recovered, with a total of n nodes. The notion of "administration resources" represents the system's administration capabilities, for example, how many processors are available online to implement automated administration scripts. In one or more embodiments, administration resources are implemented as processes within the provisioning module 81. The variable w represents an administration resource, with a total of m administration resources that can be concurrently active (i.e. m machines can be recovered, started up, or modified by the system in parallel). The number of administration resources, m, changes with time, typically increasing as machines are recovered. ETRT(v) is an estimated targeted administration time; this is time specified by an administrator/user within which the node should be recovered. P(v) is a priority of node v as set by the administrator/user; the priority may also be indicated by the ETRT(v) within which the node v should be recovered compared to the ETRT of other nodes (if applicable). T(v) is an estimated administration time for the node v alone. ET(v) is an aggregate estimated total administration time for the node v and all nodes that, directly or indirectly, depend on v. FP(v) is an adjusted final priority value of the node v. This counts in the estimated total administration time of all nodes that depend on v because, in general, a node with longer waiting time than other nodes should be recovered earlier. AT(v) is an actual administration time for a node v. AT(v) typically is not the same as ET(v), and usually is greater.

In FIG. 5, the dashed line links nodes a . . . e that do not depend on any other nodes, i.e. the "roots" of the forest or graph of dependencies 500. Other nodes f . . . l depend from one or more of the nodes a . . . e. Each arrow in the figure indicates a dependency relationship, e.g., the node f depends on nodes a and b, the nodes g, h, j, and k depend on the node c, and the nodes i and l depend on the node d. Every node has associated parameters P(v), T(v), FP(v), ET(v). For clarity, these parameters are shown for only three of the nodes (a, b, and f) in FIG. 5. Four administration resources, or "Workers" 1 . . . 4, are shown as an example. Note that administration resources, in one or more embodiments, are automated processes implemented in computer processors or the like.

Still referring to FIG. 4, at 403 the service level management module 84 checks whether the graph of dependencies 500 is empty, i.e. all nodes have been recovered. Although an empty graph is not a likely initial case, as the algorithm 400 iterates the graph 500 will progressively approach emptiness. Once the graph of dependencies 500 is empty, the algorithm 400 ends. Otherwise, at 404 the service level management module 84 recursively calculates FP(v) and ET(v) for each of the nodes, according to equations 600 shown in FIG. 6. Note that a machine with higher priority has a lower P(v) value. According to the equations of FIG. 6, FP(v) should be the highest priority of v itself and of all nodes that directly or indirectly depend on v, while ET(v) is dependent on the number of administration resources, m. In particular, if m≥n, then ET(v) should be T(v) plus the maximum of ET values among all of the nodes that directly depend on node v. That is because all of those dependent nodes can be recovered concurrently. For the opposite case of m=1, there is no concurrency and all machines are recovered sequentially, so ET(v) is T(v) plus the sum of the ET values among all of the nodes that directly depend on node v. For any other value of m, 1<m<n, an heuristic ratio r can be used (0<r<1) to measure the concurrency in the nodes to be recovered. A good approximation for r is m/n. Note that, at each iteration of the algorithm 400, T(v) of each node is updated according to A T(v) for similar node(s).

After calculating FP(v) and ET(v) for all nodes in the graph of dependencies 500, then at 405 the service level management module 84 identifies available administration resources. At 406 the service level management module 84 implements a select_nodes( ) function for selecting a batch of nodes to recover concurrently by the available administration resources w. FIG. 7 depicts pseudo-code for the select_nodes( ) function 406. The select_nodes( ) function 406 selects nodes with lower FP values (higher priority) among the set of nodes at the forest roots and assigns the selected nodes to administration resources. Among nodes with equal FP values, the select_nodes( ) function 406 selects those with larger ET values (longer total time to recover the node and all its dependencies). At 408, the administration resources recover the selected nodes in parallel. When administration of one or multiple nodes is finished, the service level management module 84 invokes a nodes_complete( ) function 410. FIG. 7 depicts pseudo code for the nodes_complete( ) function 410. The nodes_complete( ) function 410 "adjusts the forest" or updates the graph of dependencies 500 by removing recovered nodes from the forest and moving the next set of nodes to be recovered to the forest roots. Note that a node will not be moved to the roots until after administration of all the nodes from which it depends. The service level management module 84 then iterates to step 403 of checking whether the graph of dependencies 500 is empty.

Thus, the heuristic algorithm 400 consumes the acyclic dependency graph 500 and executes the administration with maximal concurrency. The algorithm comprises of four iterative procedures: (1) constructing the initial forest, including computation of the FP(v) and ET(v) values of all nodes $v_1 \ldots v_n$; (2) sorting the root nodes of the forest in select_nodes( ); (3) selecting the next set of machines to be recovered in order of priority in select_nodes( ); (4) handling completion of node administration in nodes_complete( ).

Let d denote the maximum degree of the nodes in the dependency graph, and k denote the maximum number of root nodes in the forest. Then the computational complexity for the four procedures are as follows:

O(n.d) for procedure (1): Constructing the forest data structure requires creating all the nodes and edges; each node has at most d edges. When calculating FP(v) or ET(v), all nodes q directly depending on v are visited, which results in complexity of O(n.d).

O(k.log k)+O(n.k) for procedure (2): The initial sort of the root nodes of the forest in select_nodes( ) takes O(k.log k) time. Subsequently, when recovered nodes are removed from the roots and new nodes are added into the roots, each new node is inserted into a sorted list properly so that the result list is still sorted. This takes O(k) for each node, and the time overhead for processing all nodes is O(n.k).

O(n) for procedure (3): Because the nodes are selected for administration from the head of the sorted list of root nodes, and each selected node is visited only once.

O(n.d$^2$) for procedure (4): Upon the completion of administration of any node, the next set of root nodes is determined. Suppose v is a node that depends on the recovered node. Then, procedure (4) examines whether all nodes that v depends on are recovered. If v depends on f nodes directly, this check will be performed at most O(f$^2$) times, with f no more than d.

Thus, the overall complexity is O(max(n$^2$, n.d$^2$)), as both k and d are no more than n.

Given the discussion thus far, and with reference to the drawing Figures, it will be appreciated that, in general terms, an exemplary computer-implemented method, according to an aspect of the invention, includes at 401 identifying a plurality of nodes that correspond to individual machines of the multi-machine computing system; obtaining, at at least one of the individual machines, estimated total administration times for each of the nodes; and obtaining, at the at least one of the individual machines, administration priorities for each of the nodes. The exemplary method further includes at 402 constructing, in at least one of the individual machines, a graph of dependencies among the nodes. At 405 the exemplary method includes identifying, at the at least one of the individual machines, availability of a first set of administration resources to assist in administration of one or more of the individual machines. The exemplary method further includes at 406 selecting, at the at least one of the individual machines, a first set of the nodes for administration in response to the graph of dependencies, administration priorities, estimated total administration times, and availability of the first set of administration resources. At 408, the method includes administering a first set of machines, corresponding to the first set of the nodes, in parallel using the first set of administration resources. At 410, the graph of dependencies is updated in response to administration of the first set of machines. The exemplary method then returns to 406 by selecting, at the least one of the individual machines, a subsequent set of nodes for administration in response to the updated graph of dependencies, administration priorities, estimated total administration times, and availability of a subsequent set of administration resources; and proceeds to 408, administering a subsequent set of machines, corresponding to the subsequent set of the nodes, in parallel using the subsequent set of administration resources.

In one or more embodiments, selecting each set of the nodes includes reducing (e.g., minimizing) a total time for administration of each set of the nodes in parallel by heuristically optimizing the selection of nodes while conforming to resource constraints, user-specified priorities, and dependencies among the individual machines.

In one or more embodiments, the estimated total administration times may be updated in response to actual administration times of the individual machines corresponding to the first set of the nodes. In at least one exemplary embodiment, the estimated total administration time for each node includes the estimated total administration times for all nodes dependent from that node.

In one or more embodiments, the first set of the nodes are selected according to higher administration priorities first. Administration priority ties can be resolved, in some embodiments, according to longest estimated total administration time first.

In one or more embodiments, each set of the nodes are selected from the roots of the graph of dependencies according to how many administration resources are available to implement automated administration scripts. Updating the graph of dependencies can include, in some embodiments, identifying a new root node for which all of the nodes from which it depends have been started up, and making the new root node a root of the graph of dependencies.

In one or more embodiments, each administration resource is assigned to administration an individual machine. In certain embodiments, at least some of the individual machines are used as administration resources.

Figure 8:
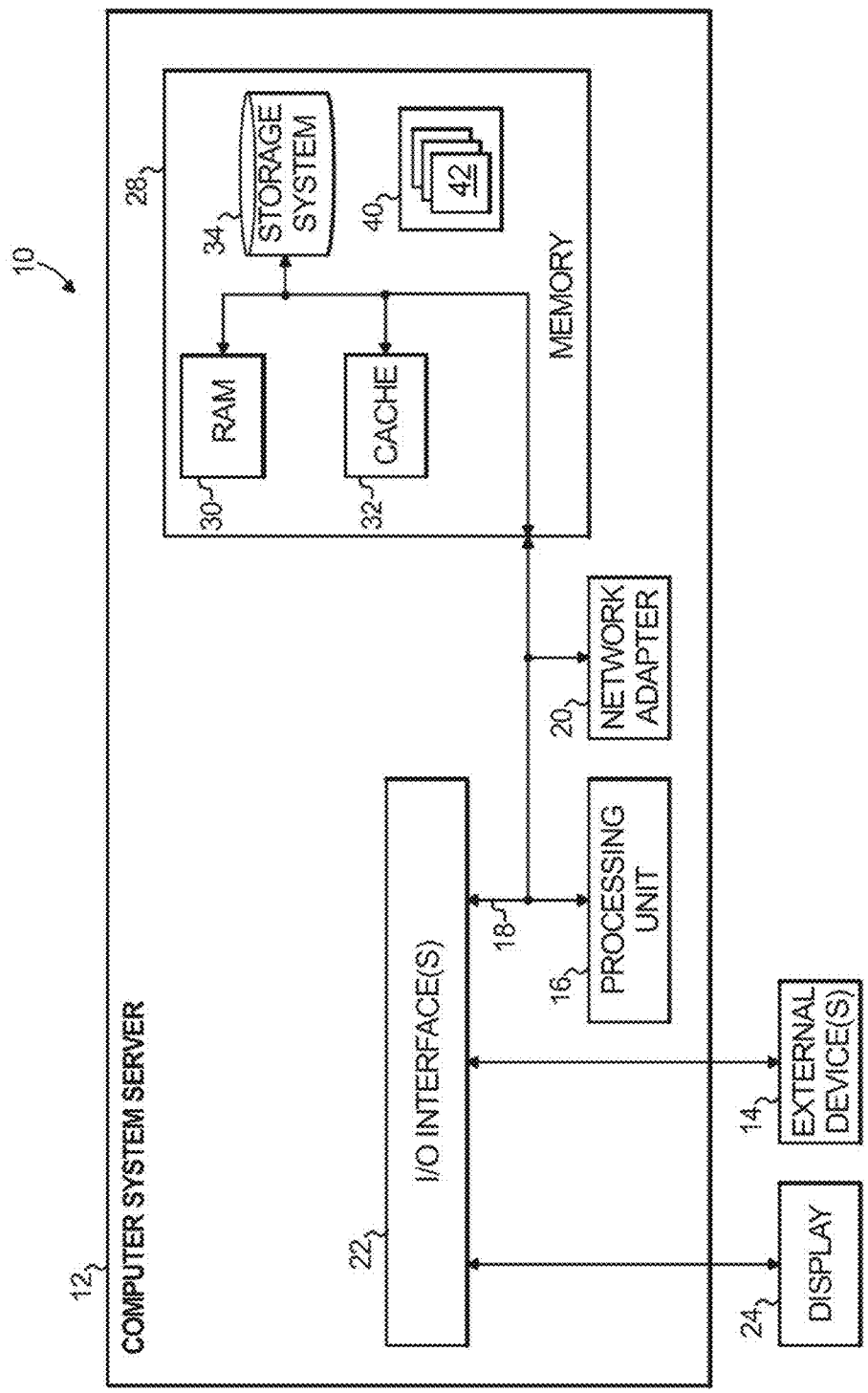
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of parallel administration of a multi-machine computing system, the method comprising:

identifying a plurality of nodes that correspond to individual machines of the multi-machine computing system;

obtaining, at least one of the individual machines, estimated total administration times for each of the plurality of nodes;

obtaining, at the at least one of the individual machines, administration priorities for each of the plurality of nodes;

constructing, in the at least one of the individual machines, a graph of dependencies among the plurality of nodes;

checking via a processor using a service level management module if the graph of dependencies of all plurality of nodes have been recovered;

identifying, at the at least one of the individual machines, availability of a first set of administration resources to assist in administration of one or more of the individual machines;

selecting using the processor, at the at least one of the individual machines, a first set of the nodes for administration in response to the graph of dependencies, administration priorities, estimated total administration times, and availability of the first set of administration resources;

administering a first set of machines, corresponding to the first set of the nodes, in parallel using the first set of administration resources;

updating the graph of dependencies in response to administration of the first set of machines;

selecting using the processor, at the least one of the individual machines, a subsequent set of nodes for administration in response to the updated graph of dependencies, administration priorities, estimated total administration times, and availability of a subsequent set of administration resources; and administering a subsequent set of machines, corresponding to the subsequent set of the nodes, in parallel using the subsequent set of administration resources.

2. The method of claim 1 wherein selecting each set of the nodes includes reducing a total time for administration of each set of the nodes in parallel by heuristically optimizing the selection of nodes while conforming to resource constraints, user-specified priorities, and dependencies among the individual machines.

3. The method of claim 1 further comprising updating the estimated total administration times in response to actual administration times of the individual machines corresponding to the first set of the nodes.

4. The method of claim 1 wherein the first set of the nodes are selected according to higher administration priorities first.

5. The method of claim 4 wherein administration priority ties are resolved according to longest estimated total administration time first.

6. The method of claim 1 wherein the estimated total administration time for each node includes the estimated total administration times for all nodes dependent from that node.

7. The method of claim 1 wherein each set of the nodes are selected from the roots of the graph of dependencies according to how many administration resources are available to implement automated administration scripts.

8. The method of claim 1 wherein updating the graph of dependencies includes identifying a new root node for which all of the nodes from which it depends have been started up, and making the new root node a root of the graph of dependencies.

9. The method of claim 1 wherein each administration resource is assigned to administer an individual machine.

10. The method of claim 1 wherein at least some of the individual machines are used as administration resources.

* * * * *